(12) United States Patent
Whitmarsh

(10) Patent No.: US 8,052,903 B2
(45) Date of Patent: Nov. 8, 2011

(54) VITREOUS CARBON MATERIAL AND PROCESS FOR MAKING THE SAME

(76) Inventor: Christopher Whitmarsh, Niskayuna, NY (US)

( * ) Notice: Subject to any disclaimer, the term of this patent is extended or adjusted under 35 U.S.C. 154(b) by 942 days.

(21) Appl. No.: 11/616,015

(22) Filed: Dec. 25, 2006

(65) Prior Publication Data

US 2008/0150180 A1 Jun. 26, 2008

(51) Int. Cl.
*C04B 33/32* (2006.01)
(52) U.S. Cl. ......................... 264/29.6; 264/44
(58) Field of Classification Search .................. 264/29.6, 264/29.1, 44
See application file for complete search history.

(56) References Cited

U.S. PATENT DOCUMENTS

| | | | |
|---|---|---|---|
| 3,109,712 A | 11/1963 | Redfern | |
| 3,284,371 A | 11/1966 | Krellner | |
| 3,626,042 A | 12/1971 | Appleby et al. | |
| 3,719,452 A | 3/1973 | Accountius | |
| 3,790,393 A | 2/1974 | Cowland et al. | |
| 3,927,186 A | 12/1975 | Vinton et al. | |
| 4,067,956 A * | 1/1978 | Franklin et al. | 423/445 R |
| 4,070,514 A * | 1/1978 | Eatherly et al. | 428/64.1 |
| 4,137,477 A | 1/1979 | Krol et al. | |
| 4,143,292 A | 3/1979 | Hosoki et al. | |
| 4,150,011 A | 4/1979 | Searfoss et al. | |
| 4,187,209 A | 2/1980 | Searfoss et al. | |
| 4,188,369 A | 2/1980 | Rautavuori et al. | |
| 4,198,382 A | 4/1980 | Matsui | |
| 4,225,569 A | 9/1980 | Matsui et al. | |
| 4,373,038 A | 2/1983 | Moraw et al. | |
| 4,504,441 A | 3/1985 | Kuyper | |
| 4,526,924 A | 7/1985 | Korb et al. | |
| 4,609,972 A | 9/1986 | Edeling et al. | |
| 4,634,531 A | 1/1987 | Nakagawa et al. | |
| 5,182,166 A | 1/1993 | Burton et al. | |
| 5,236,784 A | 8/1993 | Kobayashi et al. | |

(Continued)

FOREIGN PATENT DOCUMENTS

GB 593477 A 10/1947

(Continued)

OTHER PUBLICATIONS

Burton, R.A., et al., "Vitreous carbon matrix for low-wear carbon/metal current collectors", "IEEE Trans. Compon. Hybr.", Jun. 1989, pp. 224-228, vol. 12, No. 2.

(Continued)

*Primary Examiner* — Christina Johnson
*Assistant Examiner* — Galen Hauth
(74) *Attorney, Agent, or Firm* — Steven J. Hultquist; Hultquist IP

(57) ABSTRACT

A defect-free vitreous carbon material having a three-dimensional (x,y,z) size in which each of the x, y and z dimensions exceeds twelve millimeters. A process of making such vitreous carbon material employs a three-dimensional fiber mesh that vaporizes at elevated temperature, in which the mesh is impregnated with a polymerizable resin and thereafter the resin is cured. During the initial stage(s) of pyrolysis, the mesh volatilizes to yield a residual network of passages in the cured resin body that thereafter allows gases to escape during pyrolysis of the cured resin material to form the vitreous carbon product. As a result, it is possible to form defect-free vitreous carbon material of large size, suitable for use in structural composites, and product articles such as sealing members, brake linings, electric motor brushes, and bearing members.

24 Claims, 3 Drawing Sheets

U.S. PATENT DOCUMENTS

| | | | |
|---|---|---|---|
| 5,947,094 A * | 9/1999 | Atmur et al. | 123/668 |
| 6,506,482 B1 | 1/2003 | Burton et al. | |
| 6,620,214 B2 | 9/2003 | McArdle et al. | |
| 6,624,108 B1 | 9/2003 | Clark et al. | |
| 2001/0019798 A1* | 9/2001 | Kajiura et al. | 429/215 |
| 2005/0079201 A1 | 4/2005 | Rathenow et al. | |
| 2007/0275863 A1 | 11/2007 | Whitmarsh | |

FOREIGN PATENT DOCUMENTS

| | | |
|---|---|---|
| GB | 624312 A | 6/1949 |
| GB | 2 049 713 A | 12/1980 |
| JP | 56-009693 A | 1/1981 |
| JP | 57-051110 A | 3/1982 |
| JP | 58-055010 A | 4/1983 |
| JP | 58-131429 A | 8/1983 |
| JP | 10-130627 A | 5/1998 |
| WO | 9116826 A1 | 11/1991 |

OTHER PUBLICATIONS

Burton, R. et al, "Ultra Low Wear in Carbon Matrix Materials", "Tailored Materials Symposium", 1987, pp. 1-16, Publisher: Soc. for Metals.

Burton, R. et al., "Tribology of Carbon Matrix Composites", 1990, pp. 1-22.

Burton, R. et al., "Laser Machining for Advanced Seals", Jan. 4, 1991, pp. 1-15, Publisher: Burton Technologies Inc., Raleigh, NC 27606.

Burton, R. et al., "Friction and Wear of Glassy Carbon in Sliding Contact", "Final Report U.S. Dept. of Energy Contract No. DE-ACO2-88 CE 9007", Sep. 1, 1989, pp. 1-43.

QO Chemicals Inc., "MSDS Quacorr 1001 Resin", Feb. 1985, pp. 1-2.

Vook, R. et al., "Electrical Contacts and Electrochemical Components", "Proceedings of the International Conference on Electrical Contacts", May 9, 1989, pp. 66-77.

\* cited by examiner

VITREOUS CARBON MATERIAL AND PROCESS FOR MAKING THE SAME

BACKGROUND OF THE INVENTION

1. Field of the Invention

The present invention relates to vitreous carbon material and methodology for making vitreous carbon substantially free of pressure-induced cracking and manufacturing-related morphological defects.

2. Description of the Related Art

In the manufacture of vitreous carbon, a variety of manufacturing methods are employed. All of the currently known methods, however, are severely limited in the size of defect-free vitreous carbon material that they can produce.

Specifically, in considering bulk vitreous carbon material of three-dimensional character in an x,y,z-Cartesian coordinate system, where x and y are length and width dimensions, and z is the thickness dimension, the x and y dimensions can be of virtually any size, but the thickness z is effectively limited to no more than about 10 millimeters if defect-free pure vitreous carbon material is to be achieved. Above such thickness, all of the currently known methods for making pure vitreous carbon produce material that is cracked, pitted, chipped (spalled) or otherwise has morphological defects that render it unsuitable for commercial use.

This thickness constraint has severely limited the commercial utility of vitreous carbon for numerous applications for which it otherwise would be highly suitable.

Burton et al. U.S. Pat. No. 5,182,166 describes a process for incorporating a reinforcement material in vitreous carbon to enable large-size composite bodies to be manufactured. Burton et al. U.S. Pat. No. 6,506,482 describes use of metal fiber as a reinforcement medium in vitreous carbon to form a composite that is essentially free of foam and fume indicia, with each of its dimensions being at least 25 millimeters. By adding metal or other reinforcement materials, as described in these patents, larger-sized bodies can be made, but the resulting vitreous carbon is not homogeneous, being adulterated by metal fibers, metal mesh or other necessary reinforcement materials. The presence of such reinforcement in many instances sufficiently alters the chemical, electrical, mechanical, tribological and other properties of the vitreous carbon composite in relation to the pure vitreous carbon materials per se, as to render the resulting composite material unsuitable for the intended use. For example, metal reinforcement elements during the long pyrolytic vitrification process can form metal carbides that are brittle and substantially impair the strength and structural integrity of the composite.

There is accordingly a need for improved vitreous carbon manufacturing processes that enable pure defect-free vitreous carbon material of large size to be economically achieved.

SUMMARY OF THE INVENTION

The present invention relates to defect-free vitreous carbon material and a process of making same.

As used herein, the term "defect-free" means substantially free of cracks, pitting, chipping, and spalling.

The large sizes of vitreous carbon material enabled by the present invention makes vitreous carbon suitable for a wide variety of applications that were formerly inaccessible, e.g., due to the size constraints on material produced by prior art methods of manufacturing vitreous carbon, or the unacceptability of metal reinforcement media in the vitreous carbon product.

The invention relates in one aspect to a defect-free vitreous carbon material having a three-dimensional (x,y,z) size in which each of the x, y and z dimensions exceeds twelve millimeters.

The invention relates in another aspect to a vitreous carbon article comprising the vitreous carbon material of the invention, wherein such article is selected from the group consisting of sealing members, brake linings, electrical motor brushes and bearing members.

In another aspect, the invention relates to a process for making a defect-free vitreous carbon, such process comprising:

providing a mold including a mold cavity;

disposing in the mold cavity a pyrolytically evanescent three-dimensional fiber mesh;

introducing a polymerizable precursor resin material and a polymerization catalyst into the mold cavity, so that the polymerizable precursor resin material and the polymerization catalyst impregnate the three-dimensional mesh and initiate polymerization to form a rigid polymer material encasing the three-dimensional fiber mesh in the mold cavity; and pyrolyzing the rigid polymer material at elevated temperature, to remove the pyrolytically evanescent three-dimensional fiber mesh and yield the defect-free vitreous carbon material.

Yet another aspect of the invention relates to a method of making a defect-free vitreous carbon material, by impregnating a pyrolytically evanescent three-dimensional fiber mesh with a polymerizable resin, curing the polymerizable resin, and pyrolyzing the cured resin containing the mesh to volatilize and remove the mesh, and to vitrify the cured resin to yield the defect-free vitreous carbon material.

During the pyrolyzing step, the three-dimensional fiber mesh vaporizes before there is significant conversion of the rigid polymer material into vitreous carbon material. The vaporization of the fibers leaves an internal network of tubular voids in the rigid polymer material at locations previously occupied by fibers of the three-dimensional fiber mesh. The tubular voids allow byproduct gases evolved during the pyrolysis step to escape from the rigid polymer material without causing substantial cracks or other imperfections to form.

A further aspect of the invention relates to the manufacture of sealing components, brake linings, electrical motor brushes, bearing members, and other wear-resistant structures and structural composites from the vitreous carbon material disclosed herein.

Other aspects, features and embodiments of the invention will be more fully apparent from the ensuing disclosure and appended claims.

DETAILED DESCRIPTION OF THE INVENTION, AND PREFERRED EMBODIMENTS THEREOF

The present invention relates to defect-free vitreous carbon material having a three-dimensional (x,y,z) size in which each of the x, y and z dimensions exceeds twelve millimeters, and to a process for making such vitreous carbon material.

The vitreous carbon material of the present invention overcomes the deficiencies of the prior art, which as discussed in the Background section hereof has been unable to achieve defect-free large size vitreous carbon without the involvement of reinforcing material that renders the product material heterogeneous and unsuitable for numerous applications.

Figure 1:
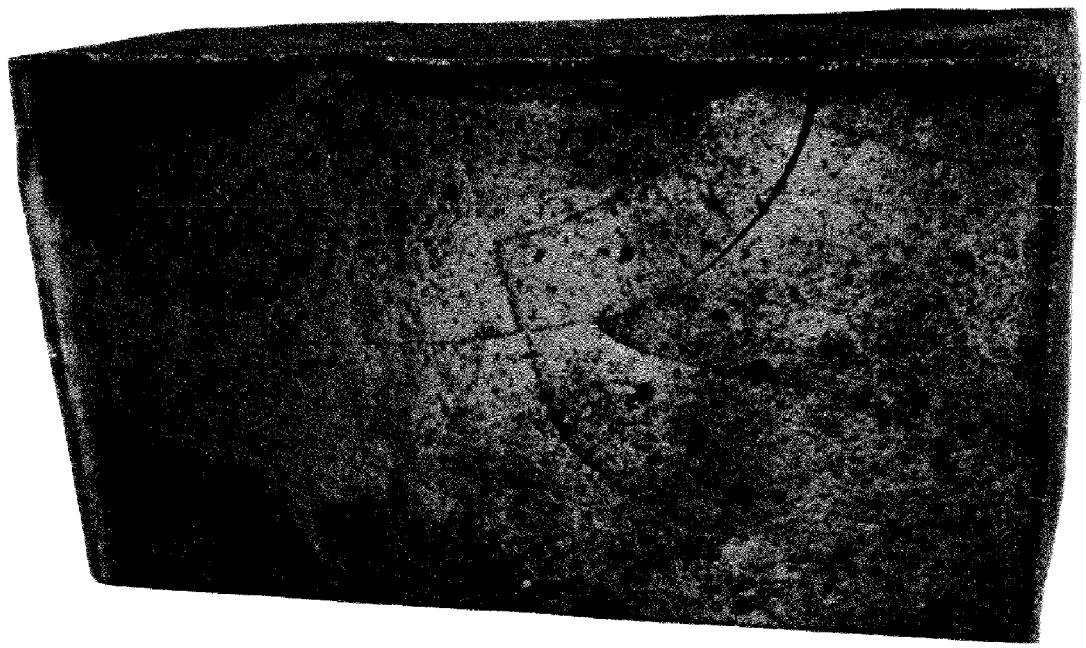
FIG. 1 ("PRIOR ART") is a photograph of vitreous carbon material made according to a method of the prior art.

FIG. 1 ("PRIOR ART") is a photograph of vitreous carbon material made according to a method of the prior art, in an attempt to make a product vitreous carbon article having a large size, with length, width and thickness dimensions each exceeding 10 millimeters. The manufacture of this vitreous carbon is more fully described in Example 1 hereinafter, but it is to be noted that such material is extensively cracked and pitted, and therefore unsuitable for general use.

Figure 2:
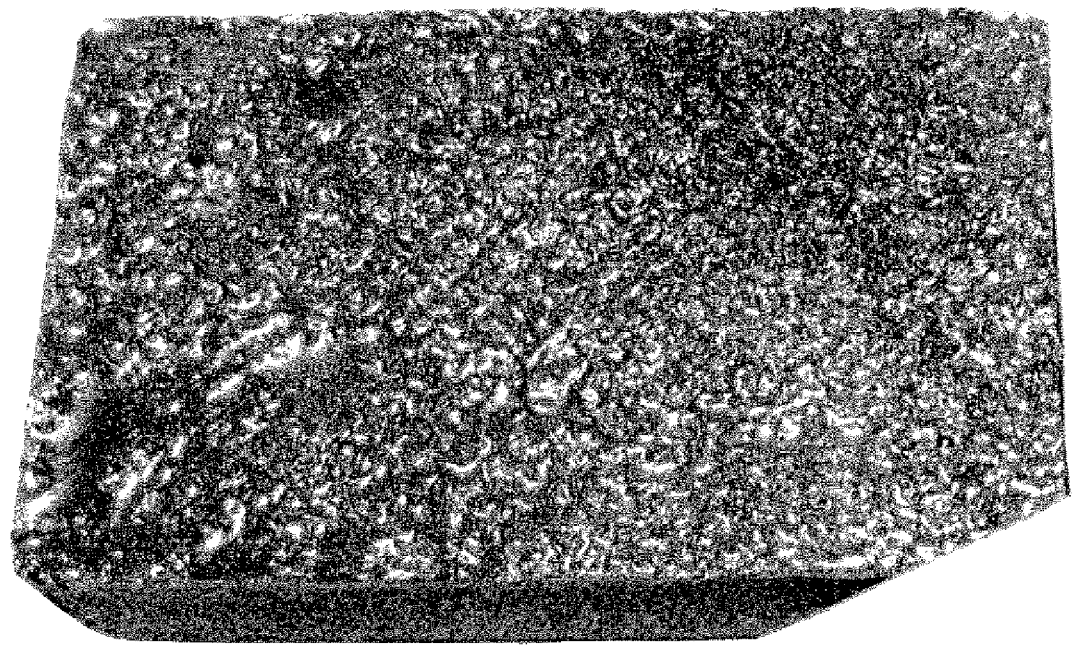
FIG. 2 is a photograph of defect-free vitreous carbon material exceeding twelve millimeters in all three (x,y,z) dimensions, made in accordance with the present invention.

FIG. 2 is a photograph of defect-free vitreous carbon material exceeding twelve millimeters in all three (x,y,z) dimensions, made in accordance with the present invention. The manufacture of such material is described hereinafter in Example 2 hereof.

The FIG. 2 material is essentially devoid of the cracking and other imperfections that are present in the prior art material shown in FIG. 1.

The present invention provides a highly effective method of making a defect-free vitreous carbon material, by impregnating a pyrolytically evanescent three-dimensional mesh with a polymerizable resin, curing the polymerizable resin, and pyrolyzing the cured resin containing the three-dimensional mesh to volatilize and remove the mesh, and vitrify the cured resin to yield the defect-free vitreous carbon material.

In a specific embodiment, large-size, defect-free vitreous carbon material of the invention can be formed by a manufacturing process including the following steps:

providing a mold including a mold cavity;

disposing in the mold cavity a pyrolytically evanescent three-dimensional fiber mesh, e.g., a mesh formed of natural and/or synthetic fibers, including substantial void volume, for example, a void volume of at least 15% of the total volume of the mesh (in which the total volume of the mesh is the sum of the fiber volume of the mesh and the void volume in the mesh structure);

introducing a polymerizable precursor resin material and a polymerization catalyst into the mold cavity, so that the polymerizable precursor resin material and polymerization catalyst impregnate the three-dimensional mesh and initiate polymerization to form a rigid polymer material encasing the three-dimensional fiber mesh in the mold cavity; and pyrolyzing the rigid polymer material at elevated temperature, preferably in an inert atmosphere, to remove the pyrolytically evanescent three-dimensional fiber mesh and yield the defect-free vitreous carbon material.

As used herein, the term "pyrolytically evanescent" in description of the three-dimensional mesh means that the mesh is volatilized during the pyrolysis of the rigid polymer material to form a vitreous carbon material, so that the resulting vapor generated from the mesh escapes from the rigid polymer material to the ambient exterior environment of such material, preferably before significant conversion of the rigid polymer material to vitreous carbon has taken place.

During the pyrolyzing step, the vapor generated from the mesh material, e.g., from natural and/or synthetic fibers forming a fiber mesh, escapes from the rigid polymer material, leaving an internal network of tubular voids, e.g., tubular passages, in the rigid polymer material at locations previously occupied by fibers of the pyrolytically evanescent three-dimensional mesh.

This internal network of tubular voids allows byproduct gases evolved during the transformation of the rigid polymer material to the vitreous carbon material, to escape the rigid polymer material without causing cracking or other imperfections.

The network of tubular passages advantageously has an average distance between adjacent passages that is less than 5 mm, preferably less than 3 mm, more preferably less than 1 mm and most preferably less than 0.5 mm. The internal passages in such network may constitute any suitable volume fraction of the product vitreous carbon material. In a specific embodiment, the internal passages constitute a volume fraction that is less than 0.5 of the total volume of the vitreous carbon material, e.g., less than 0.01 of the total volume of the vitreous carbon material. The internal passages in such network can be of any suitable size, and preferably have an average diameter in a range of from 0.001 to 1 mm.

The vitreous carbon material of the invention may contain a filler, e.g., to modify the chemical, mechanical, electrical, tribological, etc. properties of such material, but the vitreous carbon material of the invention in a preferred form is devoid of any filler material other than residue of the three-dimensional mesh remaining after pyrolysis treatment of the precursor polymer. In a specific embodiment, the vitreous carbon material is homogeneous, consisting of vitreous carbon without any additives or other materials therein. More generally, the vitreous carbon compositions of the invention can variously comprise, consist of, or consist essentially of specific ingredient(s) herein disclosed, in particular embodiments of the invention.

The vitreous carbon material of the invention may be used to form a variety of articles, such as sealing members, brake linings, electrical motor brushes, bearing members and the like, as well as structural members useful for wear-resistant applications, electrically conductive applications, etc.

The molds used in the manufacture of vitreous carbon materials of the invention may be formed of any suitable materials of construction. While aluminum sheets are used in a preferred embodiment of the invention to form an effective mold, any suitable metal, ceramic or plastic material can be used as long as it is compatible with the polymerization and pyrolysis conditions, and forms a mold from which the cured resin can be removed, e.g., by dismantling, flexing or peeling away the mold material, to disengage the rigid polymer or vitreous carbon product therefrom.

In various embodiments of the invention, the process is conducted so that pyrolysis of the rigid polymer material occurs in situ in the mold cavity. In other embodiments of the invention, the process is conducted so that the pyrolysis of the rigid polymer material occurs after the rigid polymer material is removed from the mold cavity. Depending on the specific mold material employed, the cured resin can be removed from the mold cavity in a "rubbery" or a "hard" state.

In specific embodiments of the present invention, the product vitreous carbon material is defect-free in character, and has a size in which each of the x, y and z dimensions exceeds 15, 20, 40, 100 or more millimeters.

In various embodiments of the vitreous carbon manufacturing process of the present invention, the rigid polymer is made by combining the polymerizable precursor resin material with a polymerization catalyst. In a preferred embodiment of the invention, the precursor resin material comprises furfuryl alcohol. In other embodiments of the invention, the precursor resin material comprises furfuryl alcohol and other carbon-forming materials. The catalyst that initiates the transformation of the polymerizable precursor resin material into a rigid polymer can be of any suitable type. When the polymerizable precursor resin comprises a furfuryl alcohol resin, one suitable polymerization catalyst comprises an acid chloride. In general, the resins and catalysts disclosed in Burton et al. U.S. Pat. No. 5,182,166 and Burton et al. U.S. Pat. No. 6,506,482 can be used as starting materials to form the pyrolyzable polymers used as precursors for the vitreous carbon material of the present invention.

Figure 3:
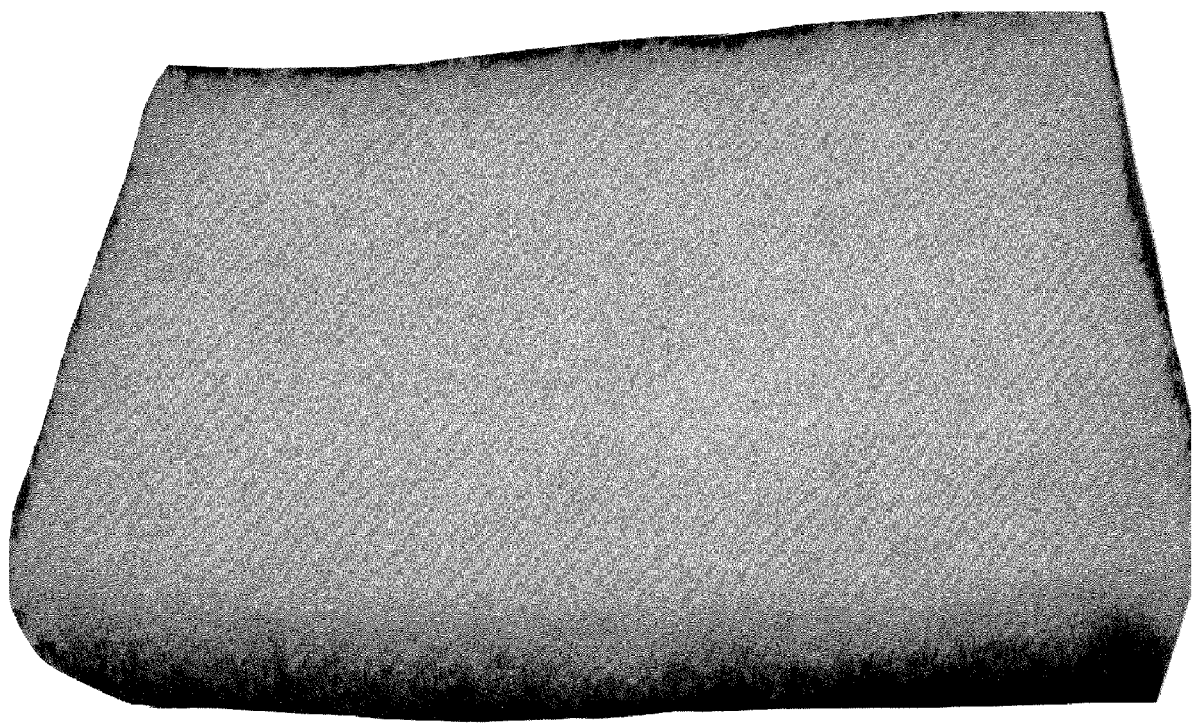
FIG. 3 is a photograph of a three-dimensional fiber mesh of a type that can be employed in the method of the present invention to form large-size, defect-free vitreous carbon material.

FIG. 3 is a photograph of a three-dimensional fiber mesh of a type that can be employed in the method of the present invention to form large-size, defect-free vitreous carbon material.

During the polymerization curing process, the precursor resin material polymerizes to form the rigid polymer material having the three-dimensional fiber mesh embedded therein. During the pyrolysis process, e.g., as conducted in an inert gas atmosphere, the three-dimensional fiber mesh is vaporized under elevated temperature pyrolysis conditions, forming an internal network of tubular voids in the rigid polymer material that is being transformed into vitreous carbon material. The internal network of tubular voids in the rigid polymer material is formed at locations formerly occupied by fibers of the three-dimensional mesh, and provides byproduct gases an escape path through the rigid polymer material during the subsequent pyrolysis process. The resulting vitreous carbon material is substantially free of cracking and other imperfections that are characteristic of prior art methods of vitreous carbon manufacture. Thus, the formation of an internal network of tubular voids by vaporizing the mesh material is a critical aspect of the present invention, and enables the production of large-size, defect-free vitreous carbon articles.

The void fraction of the fiber mesh in the practice of the invention can be of any suitable value. In various embodiments of the invention, the three-dimensional mesh has a void fraction (defined as void volume/(void volume+mesh fiber volume)) that is greater than 0.5, e.g., greater than 0.6, 0.75, 0.8, 0.9, 0.95, or 0.99, in various embodiments of the invention. Since the void fraction is subsequently impregnated with a polymerizable resin composition, and the three-dimensional mesh is volatilized, the resulting network of passages has a volume fraction in the product vitreous carbon article that may in various embodiments be less than 0.5, 0.4, 0.25, 0.2, 0.1, 0.05, or 0.01.

The three-dimensional mesh can be a fiber mesh that is woven or non-woven, or it may comprise both woven and non-woven mesh structures.

In one preferred embodiment of the present invention, the average distance between adjacent fibers of the three-dimensional fiber mesh is less than 5 millimeters. In various other preferred embodiments of the invention, the average distance between adjacent fibers of the three-dimensional fiber mesh is less than 3, 1, or 0.5 millimeters. These dimensions also characterize the resulting network of passages produced by the volatilization removal of the mesh during processing of the rigid polymer material to effect pyrolysis thereof.

The fibers in the three-dimensional fiber mesh can be substantially uniformly spaced apart from one another, or alternatively such fibers can be non-uniformly spaced apart from one another, or such fibers may be arranged in any suitable geometric or non-geometric conformation appropriate to the final vitreous carbon product. In specific embodiments, the fibers in the three-dimensional fiber mesh are interbonded at multiple contact points of such fibers to other fibers in the three-dimensional mesh.

The fibers forming the three-dimensional mesh can be of any suitable character, and can be solid material fibers, hollow fibers, or a mixture of both solid and hollow fibers. The fibers may be single component fibers, or alternatively such fibers can be formed of two or more materials.

In another embodiment of the invention, the three-dimensional mesh is formed of an open-cell foam material. In yet another embodiment, the three-dimensional mesh is constituted by a closed-cell foam material. In still other embodiments of the invention, the three-dimensional fiber mesh can be comprised of both open cell foam and closed cell foam materials.

The density of the three-dimensional fiber mesh can be of any suitable value or within any suitable range, e.g., between 10 and 0.0001 gram $cm^{-3}$, or between 0.005 and 0.020 gram $cm^{-3}$, in various embodiments of the invention. The fibers themselves may be of any suitable dimensional characteristics. In various embodiments, the average diameter of the fiber of the three-dimensional fiber mesh is between 1 and 0.001 millimeters, between 0.090 and 0.009 millimeters, between 0.01 and 0.03 millimeters, or between 0.015 and 0.025 millimeters. Such dimensions will correspondingly govern the dimensions of the network of passages in the product vitreous carbon article that is formed by pyrolytic removal of the mesh material.

In the manufacturing method of the invention, the three-dimensional mesh can simply be placed in the mold cavity, or the mesh can be compacted in or otherwise conformed to the mold cavity before the polymerizable precursor resin and catalyst are introduced into such cavity. In order to impregnate the mesh, the polymerizable precursor resin and catalyst may be introduced in the mold cavity under pressure, to force such components into the interior volume of the mesh and into the interstitial spaces between adjacent fibers.

The resin mixture of polymerizable precursor resin and polymerization catalyst is introduced into the mold in any suitable manner. For example, the polymerizable precursor resin and polymerization catalyst may be mixed with one another to form the resin mixture prior to pouring or otherwise flowing the resin mixture into the mold cavity, or the polymerizable precursor resin may be flowed into the mold concurrently with the polymerization catalyst, so that they are mixed in situ in the mold cavity, or during their introduction to the mold cavity.

In various embodiments of the present invention, the polymerizable precursor resin constitutes a substantial portion of a resin composition that may further include additional ingredients, such as polymerization control agents, dispersing agents, surfactants, pigments, fillers, stabilizers, etc., in suitable amounts or proportions. In one embodiment, the resin composition comprises a filler material in an amount from about 0.01% to about 90% by weight, based on the total weight of the resin mixture. Various fillers may be employed in the broad practice of the invention, as necessary or desirable in specific embodiments, to provide specific chemical, mechanical, electrical, and/or tribological end use properties, in the vitreous carbon product.

Potentially useful fillers in resin compositions used to impregnate three-dimensional mesh articles in the practice of the invention, can be of any suitable type, and include, without limitation, graphite powder, graphite fibers, carbon powder, carbon nanotubes, metal fibers, metal powders, metal alloy fibers, metal alloy powders, semiconductor fibers, semiconductor powders, semiconductor metal alloys, semiconductor metal powders, insulator materials, silicon bronze alloys, copper alloys, quartz, silicon, alumina, silica, molybdenum, molybdenum sulfide, zinc, zinc sulfides, metal free phthalocyanin, copper, nickel, steels, chrome, chrome-plated steels, etc.

The polymerization reaction of the polymerizable precursor resin can be carried out at any suitable temperature and pressure conditions appropriate to form a rigid polymer of the desired character for subsequent vitrification. Likewise, the pyrolysis process can be carried out at any suitable process conditions appropriate to form the desired vitreous carbon product.

In one embodiment of the present invention, the temperature at which the pyrolysis step is carried out, is at least, and preferably above, 400° C. In another embodiment, the pyrolysis temperature is 750° C. or higher. In still other embodiments, pyrolysis temperatures up to 2000° C., or even higher, can be used to produce vitreous carbon for applications requiring very high purity glassy carbon. In such high temperature, high purity processes, the pyrolysis reaction preferably is carried out under inert atmosphere, e.g., an argon ambient environment.

The features and advantages of the invention are more fully shown by the following non-limiting examples.

EXAMPLE 1

Vitreous carbon material was made by the following procedure according to the prior art.

A mold was formed by folding 0.3 mm annealed aluminum sheet into an open-ended box conformation, measuring about 100 mm in length by 60 mm in width and 35 mm in depth. Quacorr 1001, a polymerizable precursor resin based on furfuryl alcohol, was obtained from Penn Specialty Chemicals, Inc., Memphis, Tenn. The resin was mixed with Quacorr 2001 catalyst at a proportion of about 1.2 grams of catalyst per 100 grams of resin. The resulting resin mixture was immediately added to the mold cavity in an amount of approximately 400 ml. This catalyzed mixture had a working time (the period of time during which the resin mixture was a flowable liquid) of about 30 minutes.

The resin mixture after introduction to the mold cavity was cured overnight at room temperature in an ambient atmosphere, transforming the resin mixture into a rubbery polymer by the next morning. The dark, rubbery polymeric solid continued to harden over the next few days until it was totally rigid.

The cured polymer was placed in a furnace equipped with a retort and arranged for flow of nitrogen (argon could also be used) through the furnace chamber, to prevent oxidation and to carry away gaseous byproducts. The furnace was a Model F-30428, commercially available from Thermoline, Inc., Dubuque, Iowa, and fitted with a custom made 309 stainless steel retort. The cured resin was gradually heated to 750° C. over a course of 100 hours, and remained at this temperature for 1 hour, following which the furnace was shut off. The furnace then returned to room temperature over a course of several hours.

The vitreous carbon material removed from the furnace after such cool-down was observed to have cracks and fractures so large that a sheet of paper could be slid into the body of vitreous carbon at such discontinuities, penetrating at least a centimeter into the bulk volume of the material. This vitreous carbon also exhibited numerous other hair-line cracks of unknown depth on its surface. The vitreous carbon product article is shown in FIG. 1 ("Prior Art"). During its processing, this vitreous carbon material shrank by approximately 20% in each of its x, y and z dimensions, so that the final dimensions of the vitreous carbon product article included a length of about 80 mm, a width of about 60 mm and a depth of about 35 mm. will and

EXAMPLE 2

Vitreous carbon material in accordance with an illustrative embodiment of the present invention was made by the following procedure.

A mold substantially similar to the mold used in Example 1 was filled with a polyester filter media, available from McMaster-Carr Supply Company, New Brunswick, N.J. This three-dimensional fiber mesh was cut in the size and shape of the mold cavity. The same polymerizable precursor resin and polymerization catalyst as in Example 1 were used. The precursor resin and polymerization catalyst were poured into the mold cavity, to fully impregnate and encase the three-dimensional fiber mesh. Care was taken to not trap any air bubbles in the resulting fiber/resin matrix.

The resin material was allowed to cure, and subsequently submitted to pyrolysis under inert atmosphere, as in Example 1. Upon removing the vitreous carbon body from the furnace, such product article (shown in FIG. 2) was observed to be substantially free of cracks and other imperfections. A same 20% shrinkage level was observed to have occurred during processing. The product vitreous carbon article had a length of about 80 mm, a width of about 60 mm and a thickness of about 35 mm.

A comparison of FIG. 2 with FIG. 1 reveals that the use of a pyrolytically evanescent three-dimensional mesh in the fabrication of the vitreous carbon material in Example 2 yielded a vitreous carbon product that was markedly superior to the vitreous carbon material of Example 1, produced by the methodology of the prior art. Specifically, the vitreous carbon material of Example 2 was defect-free, in contrast to the cracked and pitted character of the prior art vitreous carbon material of Example 1.

While the invention has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

What is claimed is:

1. A process for making a defect-free vitreous carbon, said process comprising:
   providing a mold including a mold cavity;
   disposing in the mold cavity a pyrolytically evanescent three-dimensional fiber mesh;
   introducing a polymerizable precursor resin material and a polymerization catalyst into the mold cavity, so that the polymerizable precursor resin material and the polymerization catalyst impregnate the three-dimensional mesh and initiate polymerization to form a rigid polymer material encasing the three-dimensional fiber mesh in the mold cavity; and
   pyrolyzing the rigid polymer material at elevated temperature, to remove the pyrolytically evanescent three-dimensional fiber mesh and yield the defect-free vitreous carbon material,
   wherein the void fraction of the vitreous carbon material is less than 0.05.

2. The process of claim 1, wherein said pyrolyzing is conducted in an inert gas environment.

3. The process of claim 1, wherein said pyrolyzing is conducted in the mold cavity.

4. The process of claim 1, wherein said pyrolyzing is conducted after removal of said rigid polymer material from the mold cavity.

5. The process of claim 1, wherein the precursor resin material comprises furfuryl alcohol.

6. The process of claim 1, wherein the precursor resin material comprises furfuryl alcohol and other carbon-forming materials.

7. The process of claim 1, wherein the polymerization catalyst comprises an acid chloride.

8. The process of claim 1, wherein the three-dimensional fiber mesh has a void fraction that is greater than 0.5.

9. The process of claim 1, wherein the three-dimensional fiber mesh has a void volume that is greater than 99.5.

10. The process of claim 1, wherein the three-dimensional fiber mesh comprises at least one of natural and synthetic fibers.

11. The process of claim 1, wherein the three-dimensional fiber mesh comprises at least one of a woven structure, and a non-woven structure.

12. The process of claim 1, wherein the average distance between two adjacent fibers of the three-dimensional fiber mesh is less than 5 millimeters.

13. The process of claim 1, wherein the average distance between two adjacent fibers of the three-dimensional fiber mesh is less than 3 millimeters.

14. The process of claim 1, wherein the average distance between two adjacent fibers of the three-dimensional fiber mesh is less than 1 millimeter.

15. The process of claim 1, wherein the average distance between two adjacent fibers of the three-dimensional fiber mesh is less than 0.5 millimeters.

16. The process of claim 1, wherein fibers of the three-dimensional fiber mesh are interbonded at multiple contact points of the fibers therein.

17. The process of claim 1, wherein the three-dimensional fiber mesh comprises fibers of two or more materials.

18. The process of claim 1, wherein the three-dimensional fiber mesh has a density in a range of from 10 and 0.0001 gram cm$^{-3}$.

19. The process of claim 1, wherein the three-dimensional fiber mesh comprises fibers having an average diameter between 1 and 0.001 millimeter.

20. The process of claim 1, wherein the three-dimensional fiber mesh is conformed in shape to the mold cavity before the polymerizable precursor resin and polymerization catalyst are introduced into the mold cavity.

21. The process of claim 1, wherein the elevated temperature is over 400° C.

22. The process of claim 1, wherein the precursor resin material further comprises a filler material in an amount from about 0.01% to about 90% by weight.

23. The process of claim 22, wherein said filler comprises a material selected from the group consisting of graphite powder, graphite fibers, carbon powder, carbon nanotubes, metal fibers, metal powders, metal alloy fibers, metal alloy powders, semiconductor fibers, semiconductor powders, semiconductor metal alloys, semiconductor metal powders, insulator materials, silicon bronze alloys, copper alloys, quartz, silicon, alumina, silica, molybdenum, molybdenum sulfide, zinc, zinc sulfides, metal free phthalocyanin, copper, nickel, steels, chrome, chrome-plated steels, and combinations thereof.

24. A method of making a defect-free vitreous carbon material, said method comprising impregnating a pyrolytically evanescent three-dimensional fiber mesh with a polymerizable resin, curing said polymerizable resin, and pyrolyzing the cured resin containing said mesh to volatilize and remove said mesh, and to vitrify the cured resin to yield said defect-free vitreous carbon material, wherein the amount of pyrolytically evanescent three dimensional fiber mesh is selected such that the void fraction of the resulting vitreous carbon material is less than 0.05.

* * * * *